United States Patent
Daum et al.

(10) Patent No.: US 7,930,076 B2
(45) Date of Patent: Apr. 19, 2011

(54) SYSTEM, METHOD AND COMPUTER READABLE MEDIA FOR REDUCING WHEEL SLIDING ON A LOCOMOTIVE

(75) Inventors: Wolfgang Daum, Erie, PA (US); Rajeev Verma, Karnataka (IN); Bret Dwayne Worden, Union City, PA (US); Robert J. Stewart, Jr., Erie, PA (US); Ajith Kuttannair Kumar, Erie, PA (US)

(73) Assignee: General Electric Company, Schenectady, NY (US)

( * ) Notice: Subject to any disclaimer, the term of this patent is extended or adjusted under 35 U.S.C. 154(b) by 1058 days.

(21) Appl. No.: 11/680,697

(22) Filed: Mar. 1, 2007

(65) Prior Publication Data
US 2008/0211434 A1    Sep. 4, 2008

(51) Int. Cl.
G06F 19/00 (2006.01)
(52) U.S. Cl. .......................... 701/19; 105/128
(58) Field of Classification Search .............. 701/19; 324/160, 161; 295/1, 5, 36.1, 37, 39, 40, 295/43, 44, 48; 105/128, 130
See application file for complete search history.

(56) References Cited

U.S. PATENT DOCUMENTS

| | | | |
|---|---|---|---|
| 3,982,164 A * | 9/1976 | de Buhr et al. ................. | 318/52 |
| 3,997,822 A | 12/1976 | Logston, Jr. et al. | |
| 4,924,395 A | 5/1990 | Evans et al. | |
| 4,950,964 A | 8/1990 | Evans | |
| 5,436,538 A | 7/1995 | Garvey et al. | |
| 6,532,405 B1 * | 3/2003 | Kumar et al. .................. | 701/19 |
| 6,634,303 B1 | 10/2003 | Madsen et al. | |
| 6,813,583 B2 * | 11/2004 | Kumar et al. ................. | 702/148 |
| 7,084,602 B2 | 8/2006 | Donnelly et al. | |
| 7,467,830 B2 * | 12/2008 | Donnelly ...................... | 303/139 |

* cited by examiner

*Primary Examiner* — Dalena Tran
(74) *Attorney, Agent, or Firm* — Robert Wawrzyn, Esq.; Cian G. O'Brien, Esq.; Beusse Wolter Sanks Mora & Maire, P.A.

(57) ABSTRACT

A system for reducing wheel sliding on a locomotive is provided for a locomotive including a plurality of axles. The system includes one or more speed inferring systems coupled to each axle to detect rotation of each axle and generate detection signals based upon detecting rotation of each axle. The detection signals include one of speed signals indicative of locomotive speed and non-rotating signals indicative of a non-rotating axle. More particularly, a main controller is coupled to each speed inferring system and is responsive to each detection signal. The main controller identifies non-rotating signals of the detection signals to initiate one or more alert signals of one or more respective non-rotating axles of the plurality of axles. Additionally, the main controller is coupled to an operator panel to alert a locomotive operator of an applied status of a locomotive parking brake in response to the alert signal.

36 Claims, 4 Drawing Sheets

SYSTEM, METHOD AND COMPUTER READABLE MEDIA FOR REDUCING WHEEL SLIDING ON A LOCOMOTIVE

FIELD OF THE INVENTION

The present invention relates to locomotives, and more particularly, to a system, method and computer readable media for reducing wheel sliding on a locomotive.

BACKGROUND OF THE INVENTION

Various types of speed sensors have been employed to detect rotation of locomotive axles and wheels. For example, inductive speed sensors typically exhibit poor performance at low locomotive speeds, including low signals in response to rotation of the locomotive axles at such low locomotive speeds.

Accordingly, there is a need for a system and method for detecting and differentiating a locked locomotive axle at low locomotive speeds due to multiple reasons. The inventors have recognized that such a system and method should involve monitoring the rotation of the locomotive axles at an initial low speed, so to avoid the forming of a flat spot which requires truing of the locomotive wheel.

BRIEF DESCRIPTION OF THE INVENTION

In one embodiment of the present invention, a system for reducing wheel sliding on a locomotive is provided for a locomotive traveling at a locomotive speed and including a plurality of axles and respective pair of wheels. The system includes one or more speed inferring systems coupled to at least one axle and respective pair of wheels to detect rotation of each axle and to generate one or more detection signals based on detecting rotation of each axle. The detection signals include one or more speed signals indicative of locomotive speed and one or more non-rotating signals indicative of one or more respective non-rotating axles. More particularly, a main controller is coupled to each speed inferring system and is responsive to each detection signal. The main controller identifies one or more non-rotating signals among the detection signals to initiate one or more alert signals of the respective one or more non-rotating axles of the plurality of axles.

In another embodiment of the present invention, a method for reducing wheel sliding on a locomotive is provided for a locomotive traveling at a locomotive speed and including a plurality of axles and respective pair of wheels. The method includes coupling one or more speed inferring systems to at least one axle and respective pair of wheels to detect rotation of the respective axle. Additionally, the method includes coupling at least one speed inferring system to a main controller of the locomotive. The method further includes generating one or more detection signals from at least one speed inferring system based upon detecting rotation of the respective axle, where each detection signal includes one of a speed signal indicative of a locomotive speed or a non-rotating signal indicative of a non-rotating axle. The method further includes transmitting each detection signal from each respective speed inferring system to the main controller, before identifying each detection signal as a speed signal or non-rotation signal. Additionally, the method further includes initiating one or more alert signals of the respective one or more non-rotating axles of the plurality of axles based upon identifying one or more non-rotating signals among the detection signals.

In another embodiment of the present invention, a method for annunciating a non-rotating axle is provided for a locomotive after the locomotive has traveled a predetermined distance with the non-rotating axle. The locomotive travels at a locomotive speed and includes a plurality of axles and respective pair of wheels. The method includes monitoring the rotational speed of each axle of the plurality of axles, and monitoring the locomotive speed. The method subsequently includes integrating the locomotive speed over a time duration during which the rotational speed of at least one axle is lower than a non-rotation threshold and the locomotive speed is greater than a low speed threshold. Upon integrating the locomotive speed over a time duration which reaches a predetermined distance threshold, the method initiates an alert signal of the non-rotating axle.

In another embodiment of the present invention, computer readable media containing program instructions for reducing wheel sliding on a locomotive is provided for a locomotive traveling at a locomotive speed and including a plurality of axles and respective pair of wheels. Each plurality of axles and respective pair of wheels are coupled to one or more speed inferring systems to detect rotation of the axle. Additionally, each speed inferring system is coupled to a main controller of the locomotive. The computer readable media includes a computer program code to generate one or more detection signals from each speed inferring system based upon detecting rotation of the axle. The computer program code for generating one or more detection signals includes computer program code for generating one or more speed signals indicative of locomotive speed and computer program code for generating one or more non-rotating signals indicative of a non-rotating axle. Additionally, the computer readable media includes a computer program code for transmitting the one or more detection signals from each speed inferring system to the main controller, and a computer program code for identifying each detection signal as one of the speed signal or the non-rotation signal. The computer readable media further includes a computer program code for initiating one or more alert signals of the one or more non-rotating axles of the plurality of axles based upon the computer program code for identifying the one or more non-rotating signals of the detection signals.

In another embodiment of the present invention, an analog signal processing system for reducing wheel sliding on a locomotive is provided for a locomotive traveling at a locomotive speed and including a plurality of axles and respective pair of wheels. Each plurality of axles and respective pair of wheels are coupled to one or more speed inferring systems to detect rotation of the axle. Additionally, each speed inferring system is coupled to an analog signal processor of the locomotive. An analog signal processing system includes the analog signal processor configured to generate one or more detection signals from each speed inferring system based upon detecting rotation of the axle. The analog signal processing system further includes the analog signal processor configured to generate one or more detection signals including generating one or more speed signals indicative of locomotive speed and generating one or more non-rotating signals indicative of a non-rotating axle. Additionally, the analog signal processing system further includes an analog signal processor configured to transmit the one or more detection signals from each speed inferring system to the main controller, and a computer program code for identifying each detection signal as one of the speed signal or the non-rotation signal. The computer readable media further includes a computer program code for initiating one or more alert signals of the one or more non-rotating axles of the plurality of axles based upon the computer program code for identifying the one or more non-rotating signals of the detection signals.

Alternatively an analog signal processing system further includes a function for initiating one or more alert signals of the one or more non-rotating axles of the plurality of axles based upon function for identifying the one or more non-rotating signals of the detection signals.

BRIEF DESCRIPTION OF THE DRAWINGS

A more particular description of the invention briefly described above will be rendered by reference to specific embodiments thereof that are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE INVENTION

Figure 1:
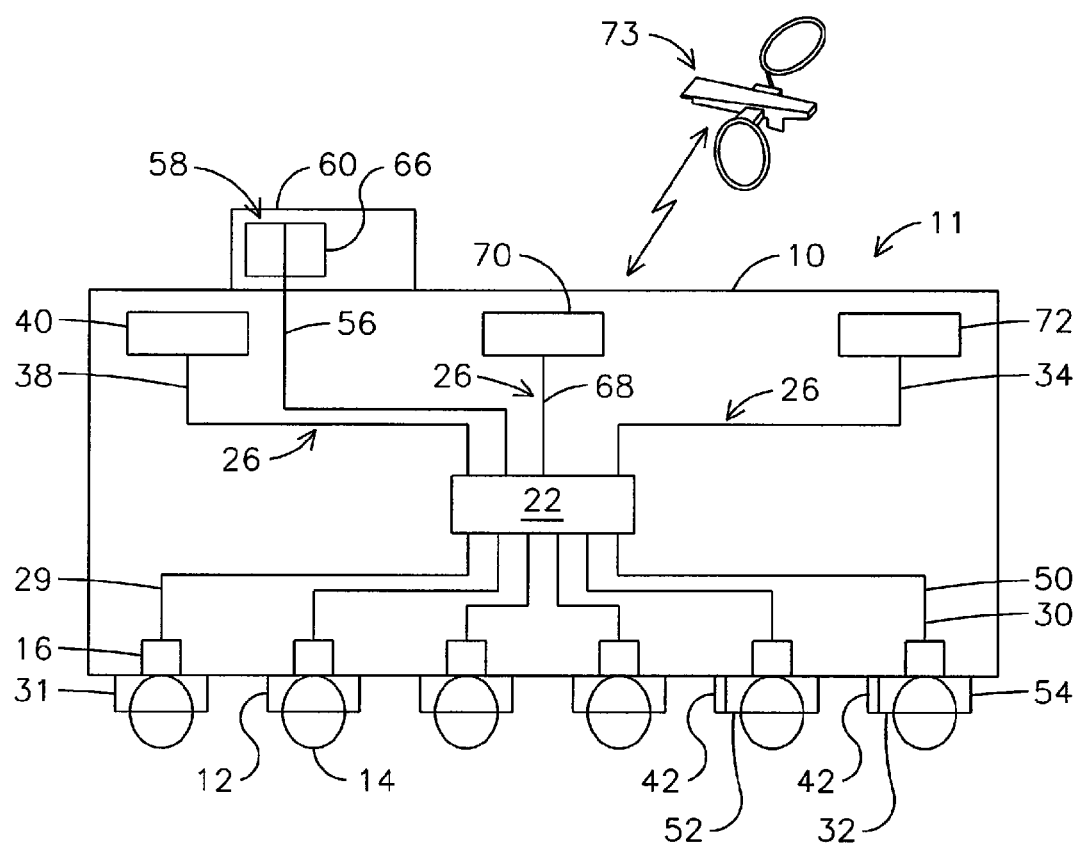
FIG. 1 is a schematic diagram of one embodiment of a system for reducing wheel sliding on a locomotive.
Figure 2:
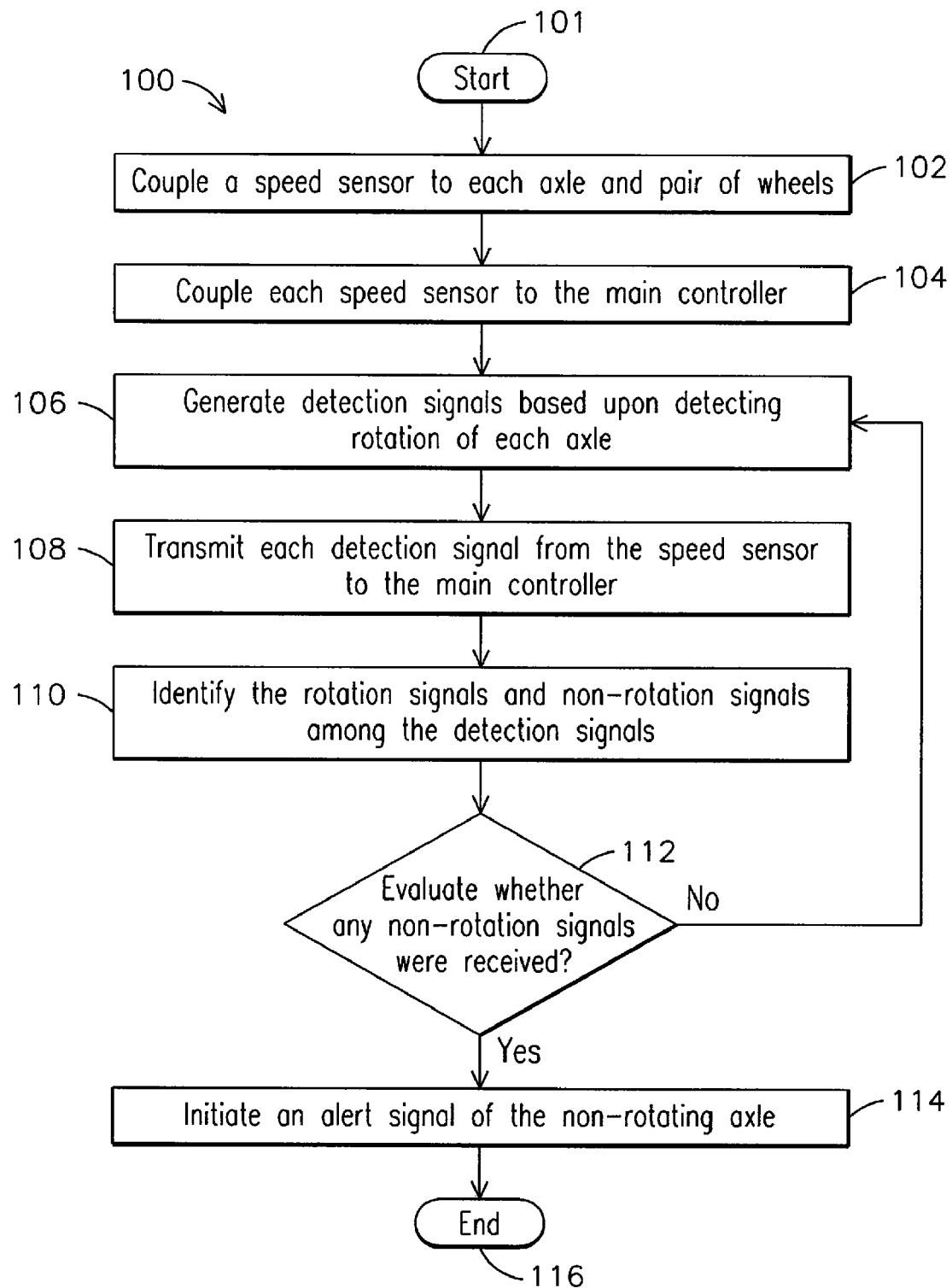
FIG. 2 is a flow chart illustrating an embodiment of a method for the system of reducing wheel sliding on a locomotive shown in FIG. 1

FIG. 1 illustrates a locomotive 10 including an embodiment of a system 11 for reducing wheel sliding on a locomotive. The system 11 is illustratively for reducing wheel sliding on a locomotive 10 traveling at a locomotive speed and including a plurality of axles 12 and respective pair of wheels 14. The system 11 illustratively includes a speed inferring system 16 coupled to at least one axle 12 and respective pair of wheels 14 to detect rotation of each axle and generate a detection signal 29,30 based upon detecting rotation of each axle 12. Although FIG. 1 illustrates a speed inferring system 16 coupled to each axle 12, the speed inferring system may just be coupled to the parking brake axles 52,54, as discussed below. Each detection signal 29,30 includes one of a speed signal 29 indicative of locomotive speed, which may be indicative of a rotating axle 31, and a non-rotating signal 30 indicative of a non-rotating axle 32. The speed signal 29 may include a rotating signal 29 indicative of a rotating axle 31. Additionally, the speed signal 29 may include a speed signal indicative of the locomotive speed and originate from a position determining device, such as a global positioning system (GPS), for example.

The rotation detection can be done by conventional speed sensing systems (like monitoring the movement of a tooth gear sensing the air gap change, encoders, hall effect sensors etc), or by calculating the estimated speed based on a sensed voltage, current and motor characteristics. Additionally, the rotation detection may be performed by sensing a voltage induced by residual magnetism or by sensing a voltage produced by the motor when a flux is impressed upon the motor, as discussed below.

It is understood that the calculation can be performed by digital means, neural network means or by analogue means or combinations thereof.

As further illustrated in FIG. 1, a main controller 22 is coupled to each speed inferring system 16 and is responsive to each detection signal 29,30. An analog signal processor 22 may replace the main controller 22 of FIG. 1, as discussed in an embodiment of the system 11 below. Additionally, the main controller 22 identifies a non-rotating signal 30 of the detection signals 29,30 from the speed inferring systems 16, to initiate an alert signal 56 of the respective non-rotating axle 32 of the plurality of axles 12. The level of each non-rotating signal 30 is less than a statistically derived value of the detection signals 29,30 adjusted by at least a predetermined amount. In an exemplary embodiment of the invention, the statistically derived value may be one of a median or mean of the detection signals, or any other equivalent statistically derived value representative of the detection signals. Additionally, the predetermined amount may be any amount sufficient to distinguish the non-rotating signal value indicative of a non-rotating axle from the remaining detection signals, such as 20% of the value of the statistically derived value, for example. In one embodiment of the system, the speed inferring system 16 may be a speed sensor. The detection signal value is indicative of the rotational speed of each axle, and may be disproportionately high for those detection signal values associated with rotating axles relative to the non-rotating signal associated with a non-rotating axle. In an exemplary embodiment of the system of the present invention, if the detection signal values received by the main controller had values of 93, 94, 90, 4, 92 and 92, the main controller identifies the non-rotating signal level (4) as less than the mean of the detection signal values (92) reduced by greater than 20% of the mean (18) of the detection signal values.

Although FIG. 1 illustrates the system 11 including one speed inferring system 16 coupled to each axle 12 and pair of wheels 14, a plurality of speed inferring systems may be coupled to each axle and its respective pair of wheels. However, as discussed above, the plurality of speed inferring systems may be exclusively coupled to the parking brake axles 52,54, for example. Additionally, although FIG. 1 illustrates one speed signal 29 and non-rotating signal 30 transmitted from each speed inferring system 16 indicative of one respective rotating axle 31 and non-rotating axle 32, a plurality of speed signals and non-rotating signals may be transmitted from each respective speed inferring system to the main controller. Additionally, although FIG. 1 illustrates one alert signal 56 transmitted from the main controller 22 to the operator panel 58, a plurality of alert signals may be transmitted, based upon the main controller identifying one or more non-rotating signals.

The speed inferring system 16 may facilitate comparison of the locomotive speed with the rotational speed of each of the plurality of axles. The non-rotating axle 32 would be detected by a rotational speed disproportionately lower than the locomotive speed, while the rotating axle 30 would be detected by a rotational speed approximately equal to the locomotive speed. In an exemplary embodiment, the non-rotating axle 32 may include a rotational speed of the locomotive speed reduced by at least a threshold differential, as discussed in further detail below. The locomotive speed may be obtained from a position determining device 73, such as a global positioning system (GPS), radar, or other means such as a locomotive speedometer. The rotational speed of each axle may be obtained using a speed sensor or from known motor characteristics, as discussed below. The main controller 22 compares the locomotive speed and each axle rotational speed, before determining whether each axle is rotating or non-rotating.

As previously discussed, the speed inferring system 16 may calculate an estimated speed of each respective axle based upon known motor characteristics of each respective axle motor. The speed inferring system may be used to only calculate an estimated speed of the parking brake axles of the locomotive.

In an exemplary embodiment, the speed inferring system 16 calculates an estimated speed of each respective axle for a DC locomotive by applying a predetermined voltage across each axle motor and detecting a disproportionately high current passing through the non-rotating axle motor, as compared to the lower current passing through the rotating axle motor. Each speed inferring system 16 may include stored current-versus-speed characteristic data for each rotating axle motor, and distinguish a rotating axle 31 from a non-rotating axle 32 based upon the characteristic speed for a particular current through the respective rotating axle motor falling below a stored predetermined non-rotating threshold speed. For example, if the stored characteristic data for a particular current passing through a rotating axle motor indicates a speed of 0.5, but the stored non-rotating threshold speed is 0.9, the speed inferring system identifies the particular axle as a non-rotating axle 32 and sends a non-rotating signal 30 to the main controller 22.

In an exemplary embodiment, the speed inferring system 16 calculates an estimated speed of each respective axle for an AC locomotive by referencing a stored voltage/frequency-versus-speed characteristic data and applying a predetermined voltage/frequency for a known speed across each axle motor. The speed inferring system 16 subsequently detects the direction of a response torque from each axle motor indicative of whether the axle motor is rotating above or below the known speed. For example, if the locomotive is traveling at 2 mph, and a predetermined voltage corresponding to 1 mph is applied to a non-rotating axle motor, the motor will give off a motoring torque. Thus, whether or not an axle motor is rotating or not rotating depends on the magnitude and direction of the torque, as the magnitude may indicate whether or not the rotating speed is below or above a predetermined threshold.

In an exemplary embodiment, the speed inferring system 16 involves detecting residual magnetic voltage from each rotating axle motor, and failing to detect the residual magnetic voltage from each non-rotating axle motor. This embodiment does not involve applying voltage to each axle, but instead involves detection of residual magnetic voltage as a result of the rotation from rotating axle motors. In DC locomotives, for example, a residual magnetic voltage is produced, while in AC locomotives, a residual voltage is produced at a known frequency. As appreciated by one of skill in the art, a speed inferring system 16 involving detection of residual magnetic voltage has sensitive limitations, in which case directing field current may be employed, as discussed below.

In an exemplary embodiment, the speed inferring system 16 may apply field current through each axle motor of a DC locomotive. The speed inferring system 16 detects a variance in the axle motor armature voltages indicative of a rotational speed variance between the axle motors. In another example, upon placing a load (resistance) across each axle motor, the sensed current through each load is indicative of a rotational speed variance between the axle motors.

In an exemplary embodiment, the speed inferring system 16 may determine a difference between the synchronous speed and motor slip of each axle motor. For an AC locomotive, the motor slip is the difference between the excitation frequency of each axle motor and its actual frequency.

As previously discussed, in an exemplary embodiment, the speed inferring system 16 involves comparing the locomotive speed with the rotational speed of each axle, where the non-rotating axle includes a rotational speed equal to the locomotive speed reduced by at least a threshold differential. The threshold differential is based upon at least one of a confidence in the non-rotating signal accuracy from the speed inferring system 16, an axle identification signal 50 indicating the identity of each axle, prior instances of non-rotation for each axle stored in a memory of the main controller 22, and the locomotive speed.

The confidence of the non-rotating signal accuracy increases in order from the speed inferring system 16 including a speed sensor, a current detector for detecting disproportionately high current upon applying a predetermined voltage to each axle motor, an armature voltage detector upon applying field current through each axle motor, and a residual magnetic voltage detector. As the confidence in the signal accuracy increases, the threshold differential can be decreased for determining a non-rotating axle.

The threshold differential can be different based upon an axle identification signal 50 originating from a parking brake axle 52,54, as compared to an axle identification signal from a non-parking brake axle. For example, there is higher probability of parking brake axles sliding than the non parking brake axles. So the non parking brake axles can have a higher threshold differential. The threshold differential similarly can be adjusted based upon prior instances of non-rotation for each axle stored in the memory of the main controller 22, as compared to the threshold differential based upon an axle without prior instances of non-rotation. The main controller 22 is coupled to each speed inferring system 16 and determines the threshold differential based upon any such stored prior instances of non-rotation for each respective axle.

The threshold differential is greater for locomotive speeds lower than a low speed threshold, as compared to the threshold differential for locomotive speeds greater than the low speed threshold. If the locomotive exceeds a low speed threshold below which a parking brake axle 52,54 typically locks up (for reasons exclusive to parking brake axles, such as the locomotive operator leaving the parking brake on, for example), the threshold differential is reduced, as the locomotive would not likely exceed the low speed threshold if the parking brake axle had locked up due to its exclusive reasons. Thus, if the locomotive speed exceeds the low speed threshold above which the parking brake axle is unlikely to lock up for exclusive reasons, the threshold difference may become independent of the axle identification signal at such locomotive speeds.

As further illustrated in FIG. 1, the main controller 22 is coupled to an operator panel 58 within an operator cabin 60 of the locomotive 10. More particularly, the operator panel 58 is responsive to the alert signal 56 to alert a locomotive operator of an applied status of a locomotive parking brake 42. The main controller 22 may initiate the alert signal 56 to the operator panel 58 at an increasing frequency based upon an increasing locomotive distance traveled beyond a predetermined distance from an initial starting point while identifying the non-rotating signal 30. In an exemplary embodiment of the invention, such a predetermined distance may be approximately 100 feet. For example, a locomotive 10 may be attached to several other locomotives in a yard, and upon detaching and propelling the other locomotives, the locomotive operator may neglect to release the parking brake 42 from the last locomotive 10 before propelling the locomotive 10 along the locomotive track at low speed. The main controller 22 may further initiate the alert signal 56 to the operator panel 58 at an increasing frequency based upon an increasing elapsed time while the main controller identifies a non-rotating signal 30 among the detection signals 29,30.

The alert signal 56 may further illustratively include an audible alarm signal, and the operator panel 58 may include an audible indicator 66 responsive to the audible alarm signal to audibly instruct the locomotive operator of the applied status of the locomotive parking brake 42. The audible alarm signal may include an audible voice indication to the locomotive operator of the applied status of the locomotive parking brake 42, or alternatively may include a generic audible warning indication prompting the locomotive operator to view the operator panel 58 and a corresponding warning indication of the applied status of the parking brake 42, for example. Although FIG. 1 illustrates an alert signal 56 directed to an operator panel 58 within the operator cabin 60, each alert signal may be directed to alternate devices and panels apart from the operator panel and located at alternate locations inside or outside the operator cabin, such that each alert signal provides adequate notice and warning of the applied status of the locomotive parking brake.

When the locomotive 10 is traveling at a locomotive speed below a threshold speed, the main controller 22 illustratively initiates at least one counteracting signal 26 to a brake system 40,70,72 of the locomotive 10 based upon receiving a non-rotating signal 30 of the detection signals 29,30. In an exemplary embodiment of the present invention, the threshold speed may be 8 miles per hour, for example. In the illustrated embodiment of FIG. 1, the counteracting signals 26 include a stop signal 34 to a brake system 70,72 of the locomotive to stop the locomotive, and an alert signal 56 to an operator panel 58 within an operator cabin 60 of the locomotive 10 to instruct a locomotive operator to release a locomotive parking brake 42 upon stopping the locomotive. In another embodiment of the present invention, the counteracting signals 26 may include a stop signal 34 followed by a parking brake signal 38 to a parking brake system 40 of the locomotive 10 to release a locomotive parking brake 42 upon stopping the locomotive, to prevent the formation of a flat spot on the respective pair of wheels 14 of the non-rotating axle 32. Although FIG. 1 illustrates one stop signal 34 and parking brake signal 38 from the main controller 22, the main controller may initiate a plurality of stop signals and parking brake signals to the respective brake system(s) and parking brake system.

The speed inferring system 16 coupled to each axle 12 further illustratively transmits an axle identification signal 50 for each detection signal 29,30. As illustrated in FIG. 1, the locomotive includes six axles 12 and respective pair of wheels, including two parking brake axles 52,54 coupled to the parking brake system 40. As illustrated in FIG. 1, the main controller 22 initiates the parking brake signal 38 after receiving the non-rotating signal 30 and the axle identification signal 50 from one of the two parking brake axles 52,54 indicative of a non-rotating parking brake axle 32.

When the locomotive 10 is traveling at a locomotive speed less than a threshold speed, in an exemplary embodiment of the present invention, the main controller 22 initiates at least one counteracting signal 26 to a brake system 40,70,72 of the locomotive based upon receiving the non-rotating signal 30 of the detection signals 29,30. The counteracting signals 26 include a brake reduction signal 68 for a predetermined time to one of an airbrake system 72 and a dynamic brake system 70 of the locomotive 10 to reduce the respective output of the airbrake system and dynamic brake system. Since application of the dynamic brake system 70 or airbrake system 72 may itself cause the non-rotating axle 32, temporarily reducing the output of the dynamic brake system and airbrake system may reduce the sliding between the respective pair of wheels and the track, resulting in rotation of the previous non-rotating axle. Subsequent to the brake reduction signal 68, the counteracting signals 26 may include a stop signal 34 to one of the brake systems 70,72 of the locomotive to stop the locomotive, followed by a parking brake signal 38 to a parking brake system 40 of the locomotive to release a locomotive parking brake 42 upon stopping the locomotive to prevent the formation of a flat spot on the respective pair of wheels for the non-rotating axle.

Each non-rotating axle 32 may result from a locked axle caused by at least one failed bearing on the non-rotating axle, or may result from a clamped wheel of the respective pair of wheels 14 of each non-rotating axle. Upon stopping the locomotive 10, if the non-rotating axle 32 results from a clamped wheel, the appropriate brake or clamp may be released and the locomotive may restart. However, if the non-rotating axle 32 results from a locked axle due to a failed bearing, for example, such a locked axle must be repaired before the locomotive may restart.

Figure 3:
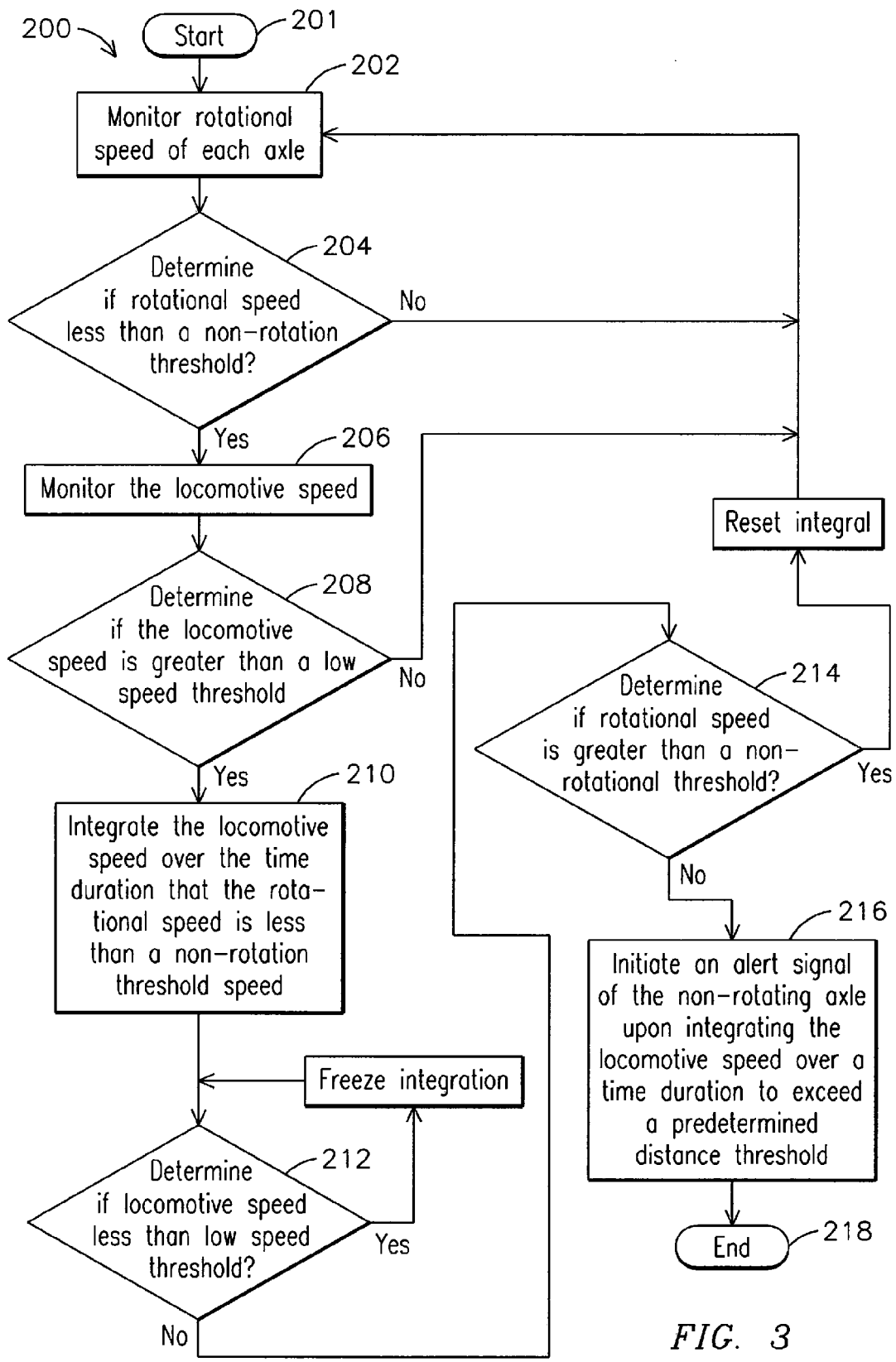
FIG. 3 is a flow chart illustrating an embodiment of a method for annunciating a non-rotating axle for the system of reducing wheel sliding on a locomotive shown in FIG. 1.

Another embodiment of the present invention includes a method 100 for reducing wheel sliding on a locomotive 10 traveling at a locomotive speed and including a plurality of axles 12 and respective pair of wheels 14. As illustrated in FIG. 3, the method 100 starts (block 101) by coupling a speed inferring system 16 to each axle 12 and respective pair of wheels 14 to detect rotation of the axle (block 102). Each speed inferring system 16 is subsequently coupled (block 104) to a main controller 22 of the locomotive 10. Detection signals 29,30 are generated (block 106) from each speed inferring system 16 based upon detecting rotation of the axle 12, where each detection signal includes one of a speed signal 29 indicative of a locomotive speed or a non-rotating signal 30 indicative of a non-rotating axle 32. Each detection signal 29, 30 is subsequently transmitted (block 108) from each speed inferring system 16 to the main controller 22, and the speed signals 29 and non-rotation signals 30 are identified (block 110) among the detection signals. Upon verifying that at least one non-rotation signal 30 was received by the main controller 22 (block 112), an alert signal 56 is subsequently initiated (block 114) of the non-rotating axle 32 among the plurality of axles 12 based upon identifying (block 110) the non-rotating signal 30 among the detection signals 29,30, before the method steps end at block 116.

Figure 4:
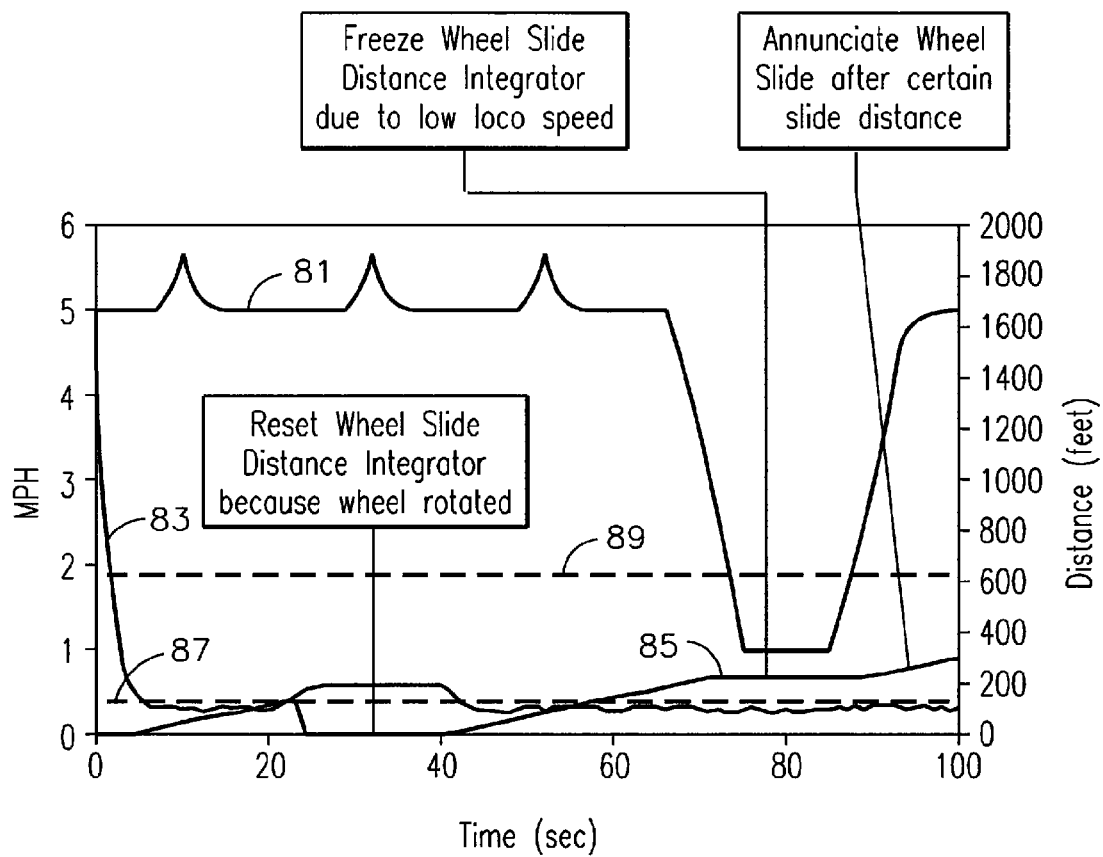
FIG. 4 is a plot of the locomotive speed, axle rotation speed, and integration of the locomotive speed versus time according to a method for annunciating a non-rotating axle.

FIG. 4 illustrates a method 200 for annunciating a non-rotating axle 32 on a locomotive 10 after the locomotive has traveled a predetermined distance with the non-rotating axle. The locomotive travels at a locomotive speed and includes a plurality of axles and respective pair of wheels. The method illustratively begins (block 201) with monitoring (block 202) the rotational speed of each axle among the plurality of axles 12. The method subsequently includes determining (block 204) whether the rotational speed of each axle is below a non-rotation threshold, which may be stored in the main controller 22, for example. If any of the axles 12 rotate at a rotational speed lower than the non-rotation threshold, the method will continue with the next step of monitoring (block 206) the locomotive speed. However, if none of the axles 12 rotate at a rotational speed lower than the non-rotation threshold, the method reverts back to monitoring the rotational speed of each axle (block 202), as illustrated in FIG. 7.

If at least one axle 12 rotates at a rotational speed lower than the non-rotation threshold (block 204), the method monitors (block 206) the locomotive speed, and determines (block 208) if the locomotive speed is greater than a low speed threshold, which also may be stored in the main controller 22, for example. If the locomotive speed is greater than a low speed threshold, the method will continue to the next step of integrating (block 210) the locomotive speed over a time duration during which the rotational speed of the axle is lower than a non-rotation threshold. However, if the locomotive speed is lower than the low speed threshold, the method reverts back to monitoring the rotational speed of each axle (block 202), as illustrated in FIG. 7, and does not commence integrating (block 210). Upon commencing the integrating step at block 210, the method determines if the locomotive speed is less than the low speed threshold (block 212). If the locomotive speed is less than the low speed threshold, the method freezes integration, and reverts back to determining whether the locomotive speed is less than the locomotive speed threshold (block 212). If the locomotive speed is not less than the low speed threshold, the method continues (along with the integrating step of block 210) to determine if the rotational speed of any axle is greater than the non-rotation threshold (block 214). If any axle rotational speed is greater than the non-rotation threshold, the integrating step of block 210 is reset and the method reverts back to monitoring the rotational speed of each axle at block 202.

Each axle of the locomotive 10 may have an individual non-rotational threshold, such as the parking brake axles 52,54 having a non-rotational threshold lower than the remaining axles, for example. Each non-rotational threshold for each axle and low speed threshold for the locomotive may be stored in the main controller 22, and may be retrieved by the main controller during the method 200, particularly during the determination steps at blocks 204,208, for example.

After commencing the integration (block 210) of the locomotive speed over a time duration while the rotational speed of the axle is below the non-rotation threshold, the method may initiate (block 216) an alert signal of a non-rotating axle based on integrating (block 210) the locomotive speed over a time duration which reaches a predetermined distance threshold with the non-rotating axle. In an exemplary embodiment, the predetermined distance threshold (which may be stored in the main controller) may be 50 feet, for example. However, the method 200 embodiment of the present invention may include different annunciations at different predetermined distance thresholds while integrating the locomotive speed over a time duration. In an exemplary embodiment, the method 200 may involve a first annunciation of sounding an alarm after integrating the locomotive speed over a first predetermined distance, and a second annunciation of stopping the locomotive using brake signals to at least one brake system after integrating the locomotive speed over a second predetermined distance, where the second predetermined distance is greater than the first predetermined distance, for example. The method 200 may involve various types of annunciations at various predetermined distance thresholds stored in the main controller.

FIG. 4 illustrates an exemplary embodiment of a plot of the locomotive speed (81) versus time, the axle speed (83) versus time, and integration of the locomotive speed (85) over time utilizing the method 200 embodiment of the present invention. Additionally, FIG. 4 illustrates an exemplary embodiment of a non-rotational threshold (87) of 0.5 mph, a low speed threshold (89) of 2 mph, and a predetermined distance threshold of 300 feet, for example. As illustrated in the plot of FIG. 4, at approximately t=5 seconds, the main controller 22 begins to integrate (block 210) the distance covered by the locomotive over time, since the integrating criteria are met (i.e., the locomotive speed is greater than the locomotive threshold of 2 mph, and the rotational speed is less than the non-rotational threshold of 0.5 mph). At approximately t=22 seconds, the rotational speed is greater than the non-rotational threshold, so the main controller 22 (block 214) resets the integral to zero. At approximately t=40 seconds, the rotational speed falls below the non-rotational threshold, the criteria for integrating (block 210) are once again met, and thus the main controller 22 recommences integrating. At approximately t=73 seconds, the locomotive speed is less than the low speed threshold, and the main controller 22 (block 212) freezes integration until such time as the locomotive speed increases above the low speed threshold (at approximately t=85 seconds). At approximately t=100 seconds, the integrated locomotive distance traveled over time increases beyond the predetermined threshold distance (300 feet) and annunciation is initiated (block 216). FIG. 4 illustrates an exemplary embodiment of a method embodiment of the present invention, and the particular times and thresholds used may vary depending on trip parameters, locomotive characteristics, and other factors.

Based on the foregoing specification, the above-discussed embodiments of the invention may be implemented using computer programming or engineering techniques including computer software, firmware, hardware or any combination or subset thereof, wherein the technical effect is to reduce wheel sliding on a locomotive. Any such resulting program, having computer-readable code means, may be embodied or provided within one or more computer-readable media, thereby making a computer program product, i.e., an article of manufacture, according to the discussed embodiments of the invention. The computer readable media may be, for instance, a fixed (hard) drive, diskette, optical disk, magnetic tape, semiconductor memory such as read-only memory (ROM), etc., or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware, such as a microprocessor, to create a computer system or computer sub-system of the method embodiment of the invention. An apparatus for making, using or selling embodiments of the invention may be one or more processing systems including, but not limited to, a central processing unit (CPU), memory, storage devices, communication links and devices, servers, I/O devices, or any subcomponents of one or more processing systems, including software, firmware, hardware or any combination or subset thereof, which embody those discussed embodiments the invention.

FIG. 1 further illustrates another embodiment of an analog processing system 11 of the present invention for reducing wheel sliding on a locomotive 10. The locomotive 10 travels at a locomotive speed and includes a plurality of axles 12 and respective pair of wheels 14. The analog processing system 11 illustratively includes a speed inferring system 16 coupled to each axle 12 and respective pair of wheels 14 to detect rotation of each axle and generate a detection signal 29,30 based on detecting rotation of each axle. The detection signal 29,30 includes a speed signal 29 indicative of locomotive speed and a non-rotating signal 30 indicative of a non-rotating axle 32. Additionally, the system 11 includes an analog signal processor 22 coupled to each speed inferring system 16. Each analog signal processor 22 is configurable to generate the detection signals 29,30 from each speed inferring system 16 based upon detecting rotation of each axle 12. To generate each detection signal 29,30 from each speed inferring system 16, the analog signal processor 22 generates a speed signal 29 indicative of locomotive speed, and a non-rotating signal 30 indicative of a non-rotating axle 32. Additionally, the analog signal processor 22 is configurable to transmit each detection signal 29,30 from each speed inferring system 16 to a main controller. Alternatively, the analog processing system 11 may configure the analog signal processor 22 to transmit each detection signal 29,30 from each speed inferring system 16 to the analog signal processor. The analog signal processor 22 is further configurable to identify each detection signal 29,30 as one of a speed signal 29 and a non-rotation signal 30, and is also configurable to initiate an alert signal 56 of each non-rotating axle 32 based on identifying a non-rotating signal 32.

The analogue signal processor 22 performing the above analogue signal processing steps may alternatively be a digital signal processor performing digital signal processing, or a neural net signal processor performing neural net signal processing. Additionally, the analogue signal processor 22 may be configurable in one of a time sequenced taylor series expansions or Kalman filters to perform the step functions.

This written description uses examples to disclose embodiments of the invention, including the best mode, and also to enable any person skilled in the art to make and use the embodiments of the invention. The patentable scope of the embodiments of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A system for reducing wheel sliding on a locomotive, the locomotive traveling at a locomotive speed and comprising a plurality of axles and respective pair of wheels, the system comprising:
    at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
    a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
    wherein said at least one speed inferring system involves comparing said locomotive speed with the rotational speed of each of said plurality of axles, wherein the rotational speed of said non-rotating axle is based on said locomotive speed reduced by at least a threshold differential.

2. The system for reducing wheel sliding on a locomotive according to claim 1, wherein said at least one speed signal comprises at least one rotating signal indicative of at least one rotating axle.

3. The system for reducing wheel sliding on a locomotive according to claim 1, wherein said at least one speed signal comprises at least one speed signal including at least one signal from a position determining device including a global positioning system (GPS).

4. The system for reducing wheel sliding on a locomotive according to claim 1, wherein said at least one speed inferring system includes a speed sensor and wherein the level of said at least one non-rotating signal is less than a statistically derived value of said at least one detection signal adjusted by at least a predetermined amount.

5. The system for reducing wheel sliding according to claim 4, wherein said statistically derived value is one of a median or mean of said at least one detection signal, and wherein said predetermined amount is 20% of the value of said statistically derived value.

6. The system for reducing wheel sliding on a locomotive according to claim 1, wherein said at least one speed inferring system calculates an estimated speed of each respective axle based upon known motor characteristics of each respective axle motor.

7. The system for reducing wheel sliding on a locomotive according to claim 6, wherein said locomotive includes a DC locomotive and wherein said at least one speed inferring system involves applying a predetermined voltage across each axle motor, and detecting a disproportionately high current passing through said non-rotating axle motor.

8. The system for reducing wheel sliding on a locomotive according to claim 6, wherein said locomotive includes an AC locomotive and wherein said at least one speed inferring system involves applying a predetermined voltage for a known speed across each axle motor, and detecting the direction of a response torque from each axle motor indicative of whether said axle motor is rotating above or below said known speed.

9. The system for reducing wheel sliding on a locomotive according to claim 6, wherein said locomotive includes a DC locomotive and wherein said at least one speed inferring system involves directing field current through each axle motor and detecting a variance in the armature component among the axle motor voltages indicative of a rotational speed variance between said axle motors.

10. The system for reducing wheel sliding on a locomotive according to claim 1, wherein said locomotive speed is obtained from one of a global positioning system (GPS) and radar, and said rotational speed of each of said plurality of axles is obtained from one of a speed sensor and known motor characteristics of each axle motor.

11. The system for reducing wheel sliding on a locomotive according to claim 1, wherein said threshold differential is based upon at least one of a confidence of said non-rotating signal accuracy, an axle identification signal indicating the identity of each axle, prior instances of non-rotation for each axle stored in a memory of said main controller and the locomotive speed.

12. The system for reducing wheel sliding on a locomotive according to claim 11, wherein said confidence of said non-rotating signal accuracy increases in order from said speed inferring system including a speed sensor, a current detector upon applying a predetermined voltage to each axle motor, a voltmeter of the stationary voltage component upon directing field current through each axle motor, and a residual magnetic voltage detector.

13. The system for reducing wheel sliding on a locomotive according to claim 11, wherein said threshold differential is different based upon said axle identification signal from a parking brake axle than said axle identification signal from a non-parking brake axle.

14. The system for reducing wheel sliding on a locomotive according to claim 11, wherein said threshold differential is different based upon said prior instances of non-rotation for each axle stored in said memory of the main controller than said threshold differential based upon an axle without prior instances of non -rotation.

15. The system for reducing wheel sliding on a locomotive according to claim 11, wherein said threshold differential is different for said locomotive speed lower than a low speed threshold than said threshold differential for said locomotive speed greater than said low speed threshold.

16. The system for reducing wheel sliding on a locomotive according to claim 1, wherein said main controller is coupled to an operator panel within an operator cabin of said locomotive, and wherein said operator panel is responsive to said at least one alert signal for alerting a locomotive operator of an applied status of a locomotive parking brake.

17. A system for reducing wheel sliding on a locomotive, the locomotive traveling at a locomotive speed and comprising a plurality of axles and respective pair of wheels, the system comprising:
at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
wherein said main controller is coupled to an operator panel within an operator cabin of said locomotive, and wherein said operator panel is responsive to said at least one alert signal for alerting a locomotive operator of an applied status of a locomotive parking brake; and
wherein said main controller initiates said at least one alert signal to said operator panel at an increasing frequency based upon an increasing locomotive distance traveled while identifying said non-rotating signal beyond a predetermined distance from an initial starting point.

18. The system for reducing wheel sliding according to claim 17, wherein said predetermined distance is approximately 100 feet.

19. A system for reducing wheel sliding on a locomotive, the locomotive traveling at a locomotive speed and comprising a plurality of axles and respective pair of wheels, the system comprising:
at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
wherein said main controller is coupled to an operator panel within an operator cabin of said locomotive, and wherein said operator panel is responsive to said at least one alert signal for alerting a locomotive operator of an applied status of a locomotive parking brake; and
wherein said at least one alert signal further includes at least one audible alarm signal, and wherein said operator panel includes an audible indicator responsive to said at least one audible alarm signal for audibly instructing said locomotive operator of said applied status of the locomotive parking brake.

20. A system for reducing wheel sliding on a locomotive, the locomotive traveling at a locomotive speed and comprising a plurality of axles and respective pair of wheels, the system comprising:
at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
wherein said locomotive speed is less than a threshold speed; and wherein said main controller initiates;
at least one counteracting signal to at least one brake system of said locomotive based upon receiving said at least one non-rotating signal of said at least one detection signal, said at least one counteracting signal comprising at least one stop signal to one of said at least one brake system of said locomotive to stop said locomotive, and
at least one alert signal to an operator panel within an operator cabin of said locomotive for instructing a locomotive operator to release a locomotive parking brake upon stopping said locomotive.

21. The system for reducing wheel sliding according to claim 20, wherein said threshold speed is approximately 8 miles per hour.

22. A system for reducing wheel sliding on a locomotive, the locomotive traveling at a locomotive speed and comprising a plurality of axles and respective pair of wheels, the system comprising:
at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
wherein said locomotive speed is less than a threshold speed; and wherein said main controller initiates at least one counteracting signal to at least one brake system of said locomotive based upon receiving said at least one non-rotating signal of said at least one detection signal, said at least one counteracting signal comprising;
  at least one stop signal to one of said at least one brake system of said locomotive to stop said locomotive, and
  at least one parking brake signal to a parking brake system of said locomotive to release a locomotive parking brake upon stopping said locomotive for preventing the formation of a flat spot on said at least one respective pair of wheels for said at least one non-rotating axle.

23. The system for reducing wheel sliding according to claim 22, wherein said at least one speed inferring system coupled to each axle further transmits an axle identification signal for each of said at least one detection signal; and wherein said locomotive comprises six axles and respective pair of wheels, including two parking brake axles coupled to said parking brake system; and wherein said main controller initiates said at least one parking brake signal upon receiving said non-rotating signal and said at least one axle identification signal from at least one of said two parking brake axles indicative of at least one non-rotating parking brake axle.

24. A system for reducing wheel sliding on a locomotive, the locomotive traveling at a locomotive speed and comprising a plurality of axles and respective pair of wheels, the system comprising:
  at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
  a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
  wherein said detection signal includes temporally spaced-apart peaks, each of said peaks based upon said at least one speed inferring system detecting rotation of said plurality of axles and respective pair of wheels.

25. The system for reducing wheel sliding according to claim 24, wherein the profile of said peaks is degraded for said locomotive speed below a threshold speed relative to the profile of said peaks for said locomotive speed greater than said threshold speed.

26. A system for reducing wheel sliding on a locomotive, the locomotive traveling at a locomotive speed and comprising a plurality of axles and respective pair of wheels, the system comprising:
  at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
  a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
  wherein said locomotive speed is less than a threshold speed; and wherein said main controller initiates at least one counteracting signal to at least one brake system of said locomotive based upon receiving said at least one non-rotating signal of said at least one detection signal, said at least one counteracting signal comprising;
  at least one brake reduction signal for a predetermined time to at least one of an
  airbrake system and a dynamic brake system of said locomotive to reduce the
  respective output of said airbrake system and dynamic brake system,
    at least one stop signal to one of said at least one brake system of said locomotive to stop said locomotive, and
    at least one parking brake signal to a parking brake system of said locomotive to release a locomotive parking brake upon stopping said locomotive for preventing the formation of a flat spot on said at least one respective pair of wheels for said at least one non-rotating axle.

27. A method for reducing wheel sliding on a locomotive, the locomotive traveling at a locomotive speed and comprising a plurality of axles and respective pair of wheels, the method comprising:
  coupling at least one speed inferring system to each of said plurality of axles and respective pair of wheels for detecting rotation of said axle;
  coupling said at least one speed inferring system to a main controller of said locomotive;
  generating at least one detection signal from each of said at least one speed inferring system based upon detecting rotation of said axle, said at least one detection signal comprising at least one speed signal indicative of locomotive speed and at least one non-rotating signal indicative of a non-rotating axle;
  comparing said locomotive speed with a rotational speed of each of said plurality of axles, said non-rotating axle has a rotational speed of said locomotive speed reduced by at least a threshold differential;
  transmitting said at least one detection signal from each of said at least one speed inferring system to said main controller;
  identifying each of said at least one detection signal as one of said speed signal and said non-rotation signal; and
  initiating at least one alert signal of said at least one non-rotating axle of said plurality of axles based upon said identifying said at least one non-rotating signal of said at least one detection signal.

28. The method for reducing wheel sliding on a locomotive according to claim 27, further comprising:
  coupling said main controller to an operator panel within an operator cabin of said locomotive, and
  wherein said initiating at least one alert signal comprises alerting a locomotive operator of an applied status of a locomotive parking brake through said operator panel responsive to said at least one alert signal.

29. The method for reducing wheel sliding according to claim 28, wherein said initiating at least one alert signal comprises initiating said at least one alert signal to said operator panel at an increasing frequency based upon an increasing locomotive distance traveled beyond a predetermined distance while identifying said non-rotating signal from an initial starting point.

30. A system for reducing wheel sliding on a locomotive, the locomotive traveling at a locomotive speed and comprising a plurality of axles and respective pair of wheels, the system comprising:
- at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
- a main controller coupled to each of said at least one speed inferring system and responsive to said at least one detection signal, said main controller for identifying said at least one non-rotating signal and for initiating at least one alert signal of said at least one non-rotating axle of said plurality of axles based upon identifying said at least one non-rotating signal of said at least one detection signal;
- wherein said at least one speed inferring system includes a speed sensor and wherein the level of said at least one non-rotating signal is less than a statistically derived value of said at least one detection signal adjusted by at least a predetermined amount;
- wherein said statistically derived value is one of a median or mean of said at least one detection signal, and wherein said predetermined amount is 20% of the value of said statistically derived value;
- wherein said locomotive speed is less than a threshold speed, and wherein said method further comprises;
  - initiating at least one counteracting signal to at least one brake system of said locomotive based upon receiving said at least one non-rotating signal of said at least one detection signal, said initiating at least one counteracting signal comprising initiating at least one stop signal to one of said at least one brake system of said locomotive to stop said locomotive, and
  - initiating at least one alert signal to an operator panel within an operator cabin of said locomotive for instructing a locomotive operator to release a locomotive parking brake upon stopping said locomotive.

31. A method for annunciating a non-rotating axle on a locomotive after the locomotive has traveled a predetermined distance with said non-rotating axle, the locomotive traveling at a locomotive speed and comprising a plurality of axles and respective pair of wheels, the method comprising:
- monitoring the rotational speed of each axle of said plurality of axles;
- monitoring said locomotive speed;
- integrating said locomotive speed over a time duration during which said rotational speed of at least one of said plurality of axles is lower than a non-rotation threshold and said locomotive speed is greater than a low speed threshold; and
- initiating at least one alert signal of said at least one non-rotating axle of said plurality of axles based upon said integrating said locomotive speed over said time duration reaching a predetermined distance threshold.

32. The method for annunciating a non-rotating axle on a locomotive according to claim 31, further comprising ceasing said integration of said locomotive speed over said time duration upon said rotational speed of said axle being greater than said non-rotation threshold.

33. Computer readable media containing program instructions for reducing wheel sliding on a locomotive, the locomotive traveling at a locomotive speed and comprising a plurality of axles and respective pair of wheels, each of said plurality of axles and respective pair of wheels coupled to at least one speed inferring system for detecting rotation of said axle, each of said at least one speed inferring system coupled to a main controller of said locomotive, the computer readable media comprising:
- a computer program code for generating at least one detection signal from each of said at least one speed inferring system based upon detecting rotation of said axle, said computer program code for generating at least one detection signal comprising computer program code for generating at least one speed signal indicative of locomotive speed and computer program code for generating at least one non-rotating signal indicative of a non-rotating axle;
- a computer program code for comparing said locomotive speed with a rotational speed of each of said plurality of axles, said non-rotating axle has a rotational speed of said locomotive speed reduced by at least a threshold differential;
- a computer program code for transmitting said at least one detection signal from each of said at least one speed inferring system to said main controller;
- a computer program code for identifying each of said at least one detection signal as one of said speed signal and said non-rotation signal; and
- a computer program code for initiating at least one alert signal of said at least one non-rotating axle of said plurality of axles based upon said computer program code for identifying said at least one non-rotating signal of said at least one detection signal.

34. A processing system for reducing wheel sliding on a locomotive, the locomotive traveling at a locomotive speed and comprising a plurality of axles and respective pair of wheels, the processing system comprising:
- at least one speed inferring system coupled to each of said plurality of axles and respective pair of wheels for detecting rotation of each axle and generating at least one detection signal based upon detecting rotation of each axle, said at least one detection signal comprising at least one speed signal indicative of locomotive speed and at least one non-rotating signal indicative of a non-rotating axle; and
- at least one signal processor coupled to each of said at least one speed inferring system, each signal processor configurable to perform the steps of:
  - generating said at least one detection signal from each speed inferring system based upon detecting rotation of each axle, comprising
    - generating said at least one speed signal indicative of locomotive speed; and
    - generating said at least one non-rotating signal indicative of a non-rotating axle based on comparing said locomotive speed with a rotational speed of each of said plurality of axles, said non-rotating axle having a rotational speed of said locomotive speed reduced by at least a threshold differential;

transmitting said at least one detection signal from each speed inferring system to a main controller;

identifying each detection signal as one of said at least one speed signal and said at least one non-rotation signal; and initiating at least one alert signal of said at least one non-rotating axle of said plurality of axles based upon identifying said at least one non-rotating signal of said at least one detection signal.

35. The system for reducing wheel sliding on a locomotive according to claim 34, wherein said signal processor is one or a combination of an analogue signal processor performing analogue signal processing, digital signal processor performing digital signal processing, and a neural net signal processor performing neural net signal processing.

36. The system for reducing wheel sliding on a locomotive according to claim 34, wherein said signal processor is configurable in one of a time sequenced taylor series expansions or Kalman filters to perform said steps.

* * * * *